J. T. ROGERS.
AUTOMOBILE LOCK.
APPLICATION FILED JULY 1, 1915.
1,164,399.
Patented Dec. 14, 1915.
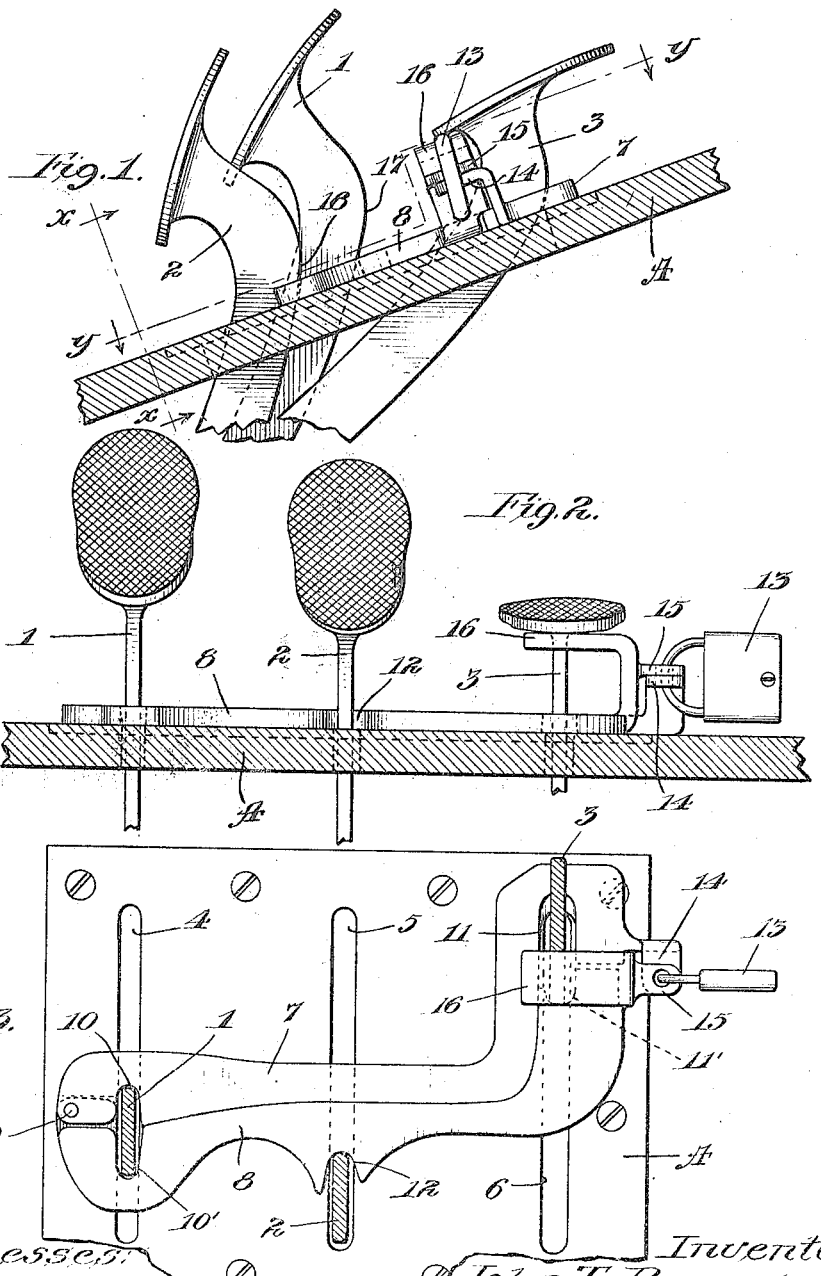
Witnesses:
H. S. Bull
A. A. Olson
Inventor,
John T. Rogers,
by Joshua R. H. Potts
his Attorney.

UNITED STATES PATENT OFFICE.

JOHN T. ROGERS, OF CHICAGO, ILLINOIS, ASSIGNOR OF ONE-THIRD TO CHARLES F. BAKER AND ONE-THIRD TO ALBERT L. PAUGH, OF CHICAGO, ILLINOIS.

AUTOMOBILE-LOCK.

1,164,399.

Specification of Letters Patent.  Patented Dec. 14, 1915.

Application filed July 1, 1915. Serial No. 37,473.

*To all whom it may concern:*

Be it known that I, JOHN T. ROGERS, a citizen of the United States, and a resident of the city of Chicago, county of Cook, and State of Illinois, have invented certain new and useful Improvements in Automobile-Locks, of which the following is a specification.

My invention relates to improvements in automobile locks, and has for its object the production of a device of this character which will be of simple and economical construction, one which may be readily and expeditiously attached or detached, and one which will be efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a fragmentary section through the foot board of an automobile showing the controlling pedals of the automobile projecting therethrough, to which is applied a locking device embodying the invention. Fig. 2 is a section taken on line *x—x* of Fig. 1, and Fig. 3 is a section taken on line *y—y* of Fig. 1.

The preferred form of construction, as illustrated in the drawing, is designed for use in connection with an automobile of the Ford manufacture, in which three controlling pedals are employed including a high and low speed pedal 1, a reverse pedal 2, and a brake pedal 3. These pedals 1, 2 and 3 are pivotally or rockingly mounted and project upwardly through elongated slots 4, 5 and 6 respectively, provided in the foot board A of the automobile. The pedal 1 is so arranged and connected that when in normal or rearward position, the same is in high or rearward position, the same is in high speed position, when in forward or depressed position, the same is in low speed position, and when in intermediate position, the same is in neutral position. The pedal 2 when in normal or rearward position is in inoperative position, reverse being effected only upon depression or forward rocking of said pedal. Likewise in connection with brake pedal 3, said pedal in normal or forward position is inoperative, setting of the brakes of the vehicle being effected upon depression or forward movement of said lever. The locking device which is designed for application to said controlling pedals, comprises two elongated members 7 and 8 which are pivoted together at 9. Said members 7 and 8 are adapted, in the application of the device, to embrace pedals 1 and 3, the adjacent edges of said members being formed with registering slots 10 and 10' and 11 and 11' to accommodate said pedals, as clearly shown in Fig. 3. Formed in the outer edge of the member 8 is a slot or notch 12 so positioned as to be adapted to engage against the forward edge of the pedal 2 when the members 7 and 8 are engaging with the pedals 1 and 3, as shown. The arrangement is such that when the device is applied, as illustrated, the pedal 1 will be held in intermediate or neutral position, the pedal 2 at its rearward terminal of movement or in inoperative position, and the pedal 3 at its forward terminal of movement or in brake-setting position. Thus, it will be seen that when the device is applied to the controlling pedals of the vehicle, the speed controlling pedal will be locked in neutral position, the reverse pedal in inoperative position and the brake pedal in brake-setting position, rendering it utterly impossible to start the engine of the vehicle or to move the latter. In the locking of the pedals against movement, it will be seen that the pedal 2 serves through the medium of the device, to lock the pedals 1 and 3 against rearward movement, the latter in turn, through the medium of the device, serving to lock the pedal 2 against forward movement, there being a mutual locking effect of the pedals upon each other.

The device is locked in engagement with the controlling pedals by means of an ordinary padlock 13 which is adapted to engage with perforated lugs 14 and 15 provided at the free ends of members 7 and 8, said lugs being adapted for registration when said members are in closed or operative position. In order to lock the device against upward movement, the member 8 is formed at its free end with an upwardly and rearwardly turned finger 16 which is adapted to engage under the head of pedal 3, when the device is applied, as clearly shown in the several views. The finger 16 is aided in the holding of the device against vertical movement through engagement of the device against the forwardly inclined forward edges 17 and 18 respectively of the pedals 1 and 2, it being clear that the inclination of said edges precludes the possibility of any upward movement of the device relative thereto.

The device is extremely simple and economical in construction, the same may be readily and easily applied or detached and will be found effective in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention what I claim as new and desire to secure by Letters Patent is:

1. In an automobile lock, the combination with the pivoted controlling pedals of an automobile, of means adapted, in coöperation with said pedals, to lock certain of said pedals against movement in one direction and the other of said pedals against movement in the opposite direction, said means comprising a pair of pivotally connected members adapted to embrace certain of said pedals and to engage against the other of said pedals; and means engaging with the free ends of said members for locking the same together in embracing relation, substantially as described.

2. In an automobile lock, the combination with the pivoted controlling pedals of an automobile, of means adapted, in coöperation with said pedals, to lock the latter against operative movement, said means comprising a pair of elongated pivotally connected members adapted to be folded into engagement with certain of said pedals and to engage against the other of said pedals, the adjacent edges of said members having registering slots adapted to accommodate the pedals embraced by said members; perforated lugs at the free ends of said members; and a locking device adapted for engagement with said lugs to lock said members in embracing relation, substantially as described.

3. In an automobile lock, the combination with the pivoted controlling pedals of an automobile, of means adapted, in coöperation with said pedals, to lock certain of said pedals against movement in one direction and the other of said pedals against movement in the opposite direction, said means comprising a pair of movably connected members adapted to embrace certain of said pedals and to engage against the other of said pedals; means for locking said members together in embracing relation; and means on one of said members adapted to engage against the under side of the head of one of said pedals for holding said members against vertical movement, substantially as described.

4. In an automobile lock, the combination with the pivoted controlling pedals of an automobile, of means adapted, in coöperation with said pedals, to lock certain of said pedals against movement in one direction and the other of said pedals against movement in the opposite direction, said means comprising a pair of movably connected members adapted to embrace certain of said pedals and to engage against the other of said pedals; means for locking said members together in embracing relation; and a backturned lip on one of said members adapted to engage against the under side of the head of one of said pedals for holding said members against vertical movement, substantially as described.

5. In an automobile lock, the combination with the pivoted controlling pedals of an automobile, of means adapted for coöperation with said pedals to lock the latter against operative movement, said means comprising a pair of movably connected members adapted to embrace certain of said pedals and to engage against the other of said pedals whereby the pedals through the medium of said members prevent movement of each other, said pedals having inclined edges engaging with said members to prevent vertical movement thereof, substantially as described.

In testimony whereof I have signed my name to this specification in the presence of two subscribing witnesses.

JOHN T. ROGERS.

Witnesses:
Joshua R. H. Potts,
Helen F. Lillis.